United States Patent
Grabarnik et al.

(10) Patent No.: US 7,596,793 B2
(45) Date of Patent: Sep. 29, 2009

(54) SMART EVENT PARSER FOR AUTONOMIC COMPUTING

(75) Inventors: Genady Grabarnik, Irvington, NY (US); Sheng Ma, Briar Cliff Manor, NY (US); Chang-shing Perng, Bedford Hills, NY (US); Abdolreza Salahshour, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1368 days.

(21) Appl. No.: 10/334,254

(22) Filed: Dec. 31, 2002

(65) Prior Publication Data

US 2004/0128674 A1 Jul. 1, 2004

(51) Int. Cl.
*G06F 9/46* (2006.01)

(52) U.S. Cl. .............. 719/318; 711/118; 711/160; 706/47; 707/6

(58) Field of Classification Search .............. 719/313, 719/318; 717/143; 711/113, 118, 160; 704/1–10; 706/47; 707/6
See application file for complete search history.

(56) References Cited

U.S. PATENT DOCUMENTS

| | | | | |
|---|---|---|---|---|
| 5,321,607 A * | 6/1994 | Fukumochi et al. | ............ | 704/4 |
| 5,361,353 A | 11/1994 | Carr et al. | ............ | 395/700 |
| 5,926,784 A * | 7/1999 | Richardson et al. | ............ | 704/9 |
| 6,061,763 A * | 5/2000 | Rubin et al. | ............ | 711/129 |
| 6,101,556 A * | 8/2000 | Piskiel et al. | ............ | 719/313 |
| 6,182,059 B1 * | 1/2001 | Angotti et al. | ............ | 706/45 |
| 6,542,899 B1 * | 4/2003 | Saulpaugh et al. | ...... | 707/103 R |
| 6,598,033 B2 * | 7/2003 | Ross et al. | ............ | 706/46 |
| 6,601,067 B1 * | 7/2003 | Hiyoshi | ............ | 707/7 |
| 6,654,741 B1 * | 11/2003 | Cohen et al. | ............ | 707/6 |
| 6,782,410 B1 * | 8/2004 | Bhagat et al. | ............ | 709/201 |
| 6,842,904 B1 * | 1/2005 | Bartz et al. | ............ | 719/328 |
| 6,934,720 B1 * | 8/2005 | Jacobs et al. | ............ | 707/200 |
| 6,941,557 B1 * | 9/2005 | Jakobson et al. | ............ | 719/316 |
| 2003/0004703 A1 * | 1/2003 | Prabhakar et al. | ............ | 704/8 |
| 2004/0054535 A1 * | 3/2004 | Mackie et al. | ............ | 704/260 |

FOREIGN PATENT DOCUMENTS

| | | |
|---|---|---|
| EP | 1 093 058 | 4/2001 |
| WO | WO 96/00436 | 1/1996 |

* cited by examiner

*Primary Examiner*—Li B Zhen
*Assistant Examiner*—Phuong N Hoang
(74) *Attorney, Agent, or Firm*—Jeanine S. Ray-Yarletts, Esq.; Steven M. Greenberg, Esq.; Carey Rodriguez Greenberg & Paul LLP

(57) ABSTRACT

An autonomic event parser configured for association with a message adapter. An autonomic event parser can include a store of parsing rules, the parsing rules having a strategically specified order. Additionally, a pattern analyzer can be programmed to identify patterns of received messages and to recommend the strategically specified order of the parsing rules. Finally, a parsing rules manager can be communicatively coupled both to the pattern analyzer and the store of parsing rules, the parsing rules manager having a configuration for ordering the parsing rules in the store based upon the recommended order of the pattern analyzer.

18 Claims, 2 Drawing Sheets

SMART EVENT PARSER FOR AUTONOMIC COMPUTING

BACKGROUND OF THE INVENTION

1. Statement of the Technical Field

The present invention relates to the field of autonomic computing and more particularly to application of parsing rules to incoming messages in a message adapter.

2. Description of the Related Art

Beginning with the advent of enterprise computing, the complexity of computing technology has increased exponentially in pace with the increasing number innovative technologies available for deployment in the enterprise. The revered Moore's Law has driven tremendous growth in the information technology sector and has been seen as the cornerstone of technological advancement. Still, those at the forefront of deploying and managing new computing technologies have recognized that with the increasing number and complexity of computing technologies comes a price: technology management.

That is to say, the principal aim of interoperability has become increasingly more difficult to attain given the requirement that each component in the enterprise must be monitored and managed. Where in the past the enterprise had previously consisted but of a few, standardized components, presently, the enterprise can include a vast number of disparate components, each able to perform magnificently within specified operational parameters, or dismally outside specified operational parameters. Thus, while it may seem to the lay person that future challenges lie with the development of many new technologies having even more capabilities, one skilled in the art will recognize that the true, future challenge lies squarely within the management of technologies which likely already exist.

In the famed manifesto, *Autonomic Computing: IBM's Perspective on the State of Information Technology*, Paul Horn, Senior Vice President of IBM Research, observed, "It's not about keeping pace with Moore's Law, but rather dealing with the consequences of its decades-long reign." Given this observation, Horn suggested a computing parallel to the autonomic nervous system of the biological sciences. Namely, whereas the autonomic nervous system of a human being monitors, regulates, repairs and responds to changing conditions without any conscious effort on the part of the human being, in an autonomic computing system, the system must self-regulate, self-repair and respond to changing conditions, without requiring any conscious effort on the part of the computing system operator.

Thus, while the autonomic nervous system can relieve the human being from the burden of coping with complexity, so too can an autonomic computing system. Rather, the computing system itself can bear the responsibility of coping with its own complexity. The crux of the IBM manifesto relates to eight principal characteristics of an autonomic computing system:

I. The system must "know itself" and include those system components which also possess a system identify.

II. The system must be able to configure and reconfigure itself under varying and unpredictable conditions.

III. The system must never settle for the status quo and the system must always look for ways to optimize its workings.

IV. The system must be self-healing and capable of recovering from routine and extraordinary events that might cause some of its parts to malfunction.

V. The system must be an expert in self-protection.

VI. The system must know its environment and the context surrounding its activity, and act accordingly.

VII. The system must adhere to open standards.

VIII. The system must anticipate the optimized resources needed while keeping its complexity hidden from the user.

Notably, in accordance with the eight tenants of autonomic computing, the automated management of individual components within a computing solution can require the periodic communication to a solution manager of the status of the individual components. Presently, in conventional component management systems, individual components communicate different aspects of their status to the solution manager, including, for instance, component configuration, component performance, component resource consumption, and significant changes in the normal operation or environment of the component. In this regard, the data collected during this process can be vital to the solution manager's monitoring, regulating and ensuring the continuous operation of the solution.

In a solution consisting of many heterogeneous components, the problem of monitoring the status of each component can be compounded by the sheer diversity of message types and formats of the various status messages received from the respective different components in the solution. In this regard, individual component developers typically compose and format status messages as will be convenient to the component developers rather than the solution manager. To accommodate the disparate composition and format of the messages, message adapters often are disposed in between the components and the solution manager and configured with parsing rules to match the different formats and types of messages which can be received from the disparate components. By matching the proper parsing rule with a corresponding message, the message adapter can properly adapt the message for recognition and processing within the solution manager.

U.S. Pat. No. 5,361,353 to Carr et al. for SYSTEM FOR PARSING MESSAGE UNITS FROM AN UNSTRUCTURED MESSAGE STREAM OF INTERLEAVED MESSAGE UNITS TO FORM STRUCTURED MESSAGES illustrates one such prior art attempt to adapt disparately formatted messages to a uniform format. Specifically, in the message structuring system of the Carr invention, each message in a message stream can be parsed using parsing rules of known patterns and delimiting characters to extract the message components or tokens. Structuring rules subsequently can be applied to determine the interrelationship between two or more messages. In this way, the Carr system can recover information and meaning not explicitly contained in the plain text message by analyzing preceding message lines. Finally, the Carr system can construct a structured message based upon the parsed components and software recovered information.

Nevertheless, in a high-transaction environment, where a high volume of incoming messages must be matched against every parsing rule, the parsing rules must be processed sequentially in a top-down or bottom-up order to locate a suitable match between the incoming message and a parsing rule. Yet, the processing of locating matching parsing rules in a list of parsing rules can be time consuming and tedious. Often, the process of locating matching rules can create a bottleneck within the message adapter giving rise to a performance deterioration in the entire solution. Accordingly, there remains a long-felt unsolved need for a mechanism through which the process of locating matching rules in a list of parsing rules can be expedited while avoiding the deficiencies of the known art.

SUMMARY OF THE INVENTION

The present invention is an autonomic event parser configured for association with a message adapter. In a preferred aspect of the present invention, an autonomic event parser can include a store of parsing rules, the parsing rules having a strategically specified order. Additionally, a pattern analyzer can be programmed to identify patterns of received messages and to recommend the strategically specified order of the parsing rules. Finally, a parsing rules manager can be communicatively coupled both to the pattern analyzer and the store of parsing rules, the parsing rules manager having a configuration for ordering the parsing rules in the store based upon the recommended order of the pattern analyzer.

In a preferred aspect of the invention, a cache of selected ones of the parsing rules can be included in the autonomic event parser. As such, a cache manager can be communicatively coupled both to the pattern analyzer and the cache, the cache manager having a configuration for ordering the selected ones of the parsing rules in the cache based upon the recommended order of the pattern analyzer. A message filter service yet further can be coupled to the pattern analyzer and programmed to quash selected ones of received messages based upon at least one message filter configured according to patterns identified in the pattern analyzer. Finally, a rule factory can be coupled to the store of parsing rules and configured to produce new parsing rules based upon a set of user specified terms.

In an application system, a message adapter which has been configured in accordance with the present invention can include a message subscription/publication service configured to accept subscriptions from subscribing programmatic elements in the application system, and to accept publication requests from publishing components in the application system. A message receiver further can be configured to receive published messages from individual ones of the publication requests. Finally, an autonomic event parser can be coupled to the message receiver.

The autonomic event parser can include a store of parsing rules, the parsing rules having a strategically specified order, a pattern analyzer programmed to identify patterns of the received messages and to recommend the strategically specified order of the parsing rules, and, a parsing rules manager communicatively coupled both to the pattern analyzer and the store of parsing rules. The parsing rules manager can have a configuration for ordering the parsing rules in the store based upon the recommended order of the pattern analyzer. The autonomic event parser, by comparison, can have a configuration for selecting and applying individual ones of the parsing rules to the received messages to produce uniformly formatted messages suitable for transmission to the subscribing programmatic elements in the application system.

A message adapting method can include the step of receiving disparately formatted messages from publishing ones of application components in an application system. Individual parsing rules can be selected and activated from among a store of parsing rules to each of the received disparately formatted messages to produce uniformly formatted messages suitable for transmission to subscribing elements in the application system. Patterns of the received messages can be analyzed. Consequently, each of the individual parsing rules in the store of parsing rules can be ordered according to the analyzed patterns of the received messages.

Similarly, selected ones of the applied parsing rules cached. Subsequently, each of the selected ones of the cached parsing rules can be ordered according to the analyzed patterns of the received messages. Notably, at least one message filter can be configured. As a result, at least one configured message filters can be activated. Thus, selected ones of the received messages can be filtered based upon the activated configured message filters. In this regard, the activating step can include activating the configured message filters based according to the analyzed patterns of the received messages.

In accordance with the inventive arrangements, a self-learning mechanism can be provided in which rules can be constructed which not only can be based upon the frequency and lexicon of entries and words, but more importantly the rules can be constructed based upon patterns and dependency relationships observed among incoming messages and events. More specifically, keywords and symbols, provided by domain experts, can be used in combination to further detect pattern (aggregation of words and symbols in specific sequence and placement) and dependency relationships that may exist between incoming messages to either construct new rules or find a matching parsing rules or assign one from list of existing ones.

Accordingly, within the present invention, parsing rules can be autonomically built based upon those incoming messages and events. It will be recognized in consequence that these constructed rules fall beyond simple usage of lexicon or a dictionary to parse speech words from an input stream. In other words, a mechanism can be provided based upon dependency knowledge and self-learning to self-optimize the rules by observing patterns from incoming events and adaptation to dynamic environment. In this regard, an autonomic mechanism further can be provided for full control over the life cycle of parsing and filtering rules including discovery, creation, maintenance and tuning, and removal of the obsolete rules.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is an autonomic event parser configured for operation within a message adapter. In accordance with the inventive arrangements, the autonomic event parser can structure and cache parsing rules autonomically according to detected patterns of incoming messages so as to minimize resource consumption when handling incoming messages in an associated message adapter. Self-adjusting filters further can be provided to control the flow of incoming messages and to quash those messages which tend to cause resource consumption in return for little benefit, while allowing the passage of other incoming messages which are considered important in view of the detected patterns. Finally, new parsing rules can be automatically and dynamically created based upon a set of potential keywords supplied by domain experts.

Figure 1:
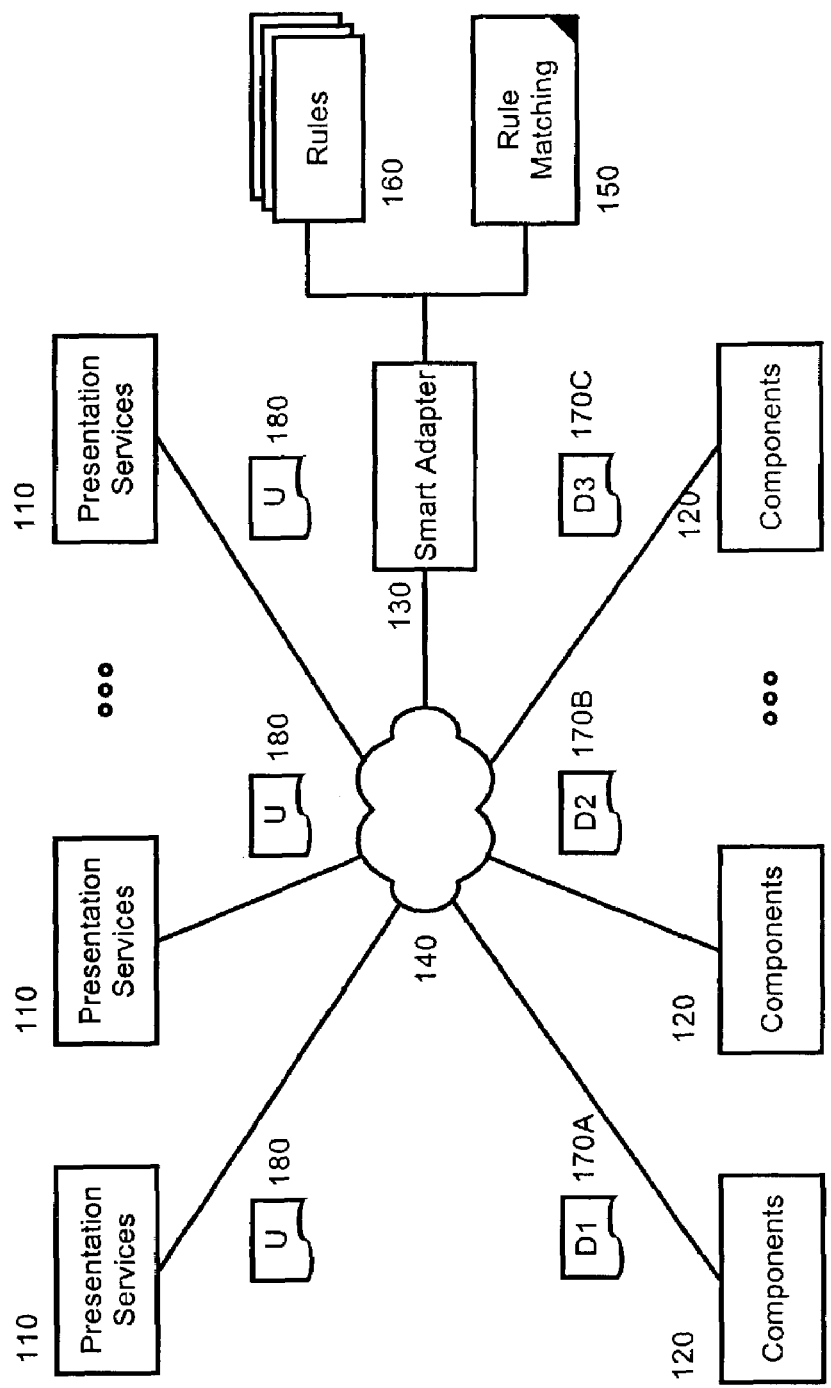
FIG. 1 is a pictorial illustration of message adapting system configured with the autonomic event parser of the present invention; and, FIG. 2 is a schematic illustration of a message adapter which has been configured with the autonomic event parser of FIG. 1.

FIG. 1 is a pictorial illustration of message adapting system configured with the autonomic event parser of the present invention. The message adapting system can include a multiplicity of components 120 communicatively engaged with subscribing presentation services 110 over the computer communications network 140. A message adapter 130 having the autonomic event parser of the present invention can mediate the translation of disparately formatted messages 170A, 170B, 170C into uniformly formatted messages 180. To that end, the message adapter 130 can apply parsing rules 160 to received disparately formatted messages 170A, 170B, 170C to produce the uniformly formatted messages.

Importantly, to facilitate the application of selected ones of the parsing rules 160, a parsing rules matching process 150 can minimize resource consumption when selecting individual ones of the parsing rules 160 for application to the disparately formatted messages 170A, 170B, 170C. In that regard, the parsing rules matching process 150 can dynamically order the parsing rules 160 within the store of parsing rules based upon the most frequently recognized incoming messages 170A, 170B, 170C. Additionally, the most frequently accessed parsing rules can be cached so as to be more readily available to be applied to incoming messages 170A, 170B, 170C.

Importantly, the cached rules can be selectively flushed from the cache when it no longer remains appropriate for the cached rules to remain in the cache—e.g. when the rules are deemed to have become stale based upon a time expiration, a least recently used, or a least frequently used policy. Additionally, cached rules can become expelled from the cache where the rules no longer remain valid contextually due to the changing nature of resources in the computer communications network 140, or where the formatting of the incoming messages 170A, 170B, 170C no longer remains valid.

Figure 2:
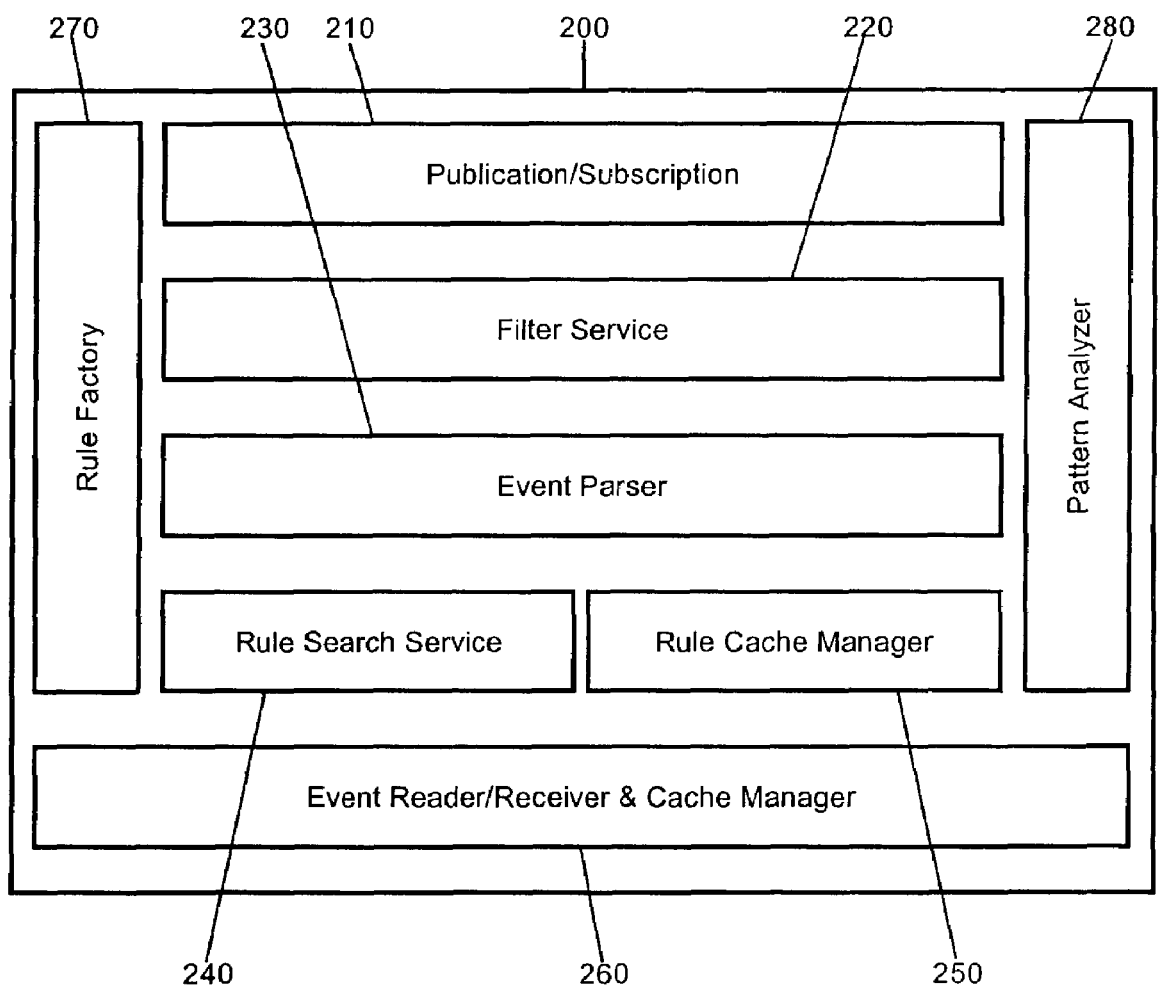

FIG. 2 is a schematic illustration of an exemplary message adapter configured with an autonomic event parser according to the present invention. In the exemplary message adapter 200, a publication/subscription module 210 can provide an interface through which corresponding presentation interfaces can subscribe to messages from particular ones of system components. Likewise, individual system components can register to publish messages to the message adapter 200 through the publication/subscription module 210.

Actual messages can be processed initially in an event receiver 260. More particularly, the event receiver 260 can collect messages and events generated by message providers. Notably, the types of messages which can be received in the event receiver 260 can range from log files produced by legacy application systems, to XML messages posted by Web services. In any case, a rule search service 240 can be coupled to the event receiver 260 in which incoming events and messages can be matched to an individual one of a set of parsing rules.

The rule search service 240 first can search a rules cache containing the most recently/most frequently used rules. If no match can be identified within the cache, the rule search service 240 can search a complete list of rules stored outside of the cache. Finally, the rule search service 240 can rearrange the ordering of the rules within the list of rules stored outside of the cache. In particular, depending upon whether the rule search service 240 searches the list of rules on a top-to-bottom, or bottom-to-top basis, the most recently or most frequently used rules can be placed near the top or the bottom of the list, as the case may be, in order to expedite the location of those strategically placed rules.

A rule cache manager 250 can be provided in which the most recently or most frequently used rules can be written to cache and ordered so as to place the most recently or most frequently used cached rules in a position most likely to be considered first when the rule search service 240 accesses the cache. Once the rule search service 240 matches a suitable rule with an incoming message, an event parser 230 can apply the matching parsing rule to the incoming message so as to appropriately identify the incoming message for corresponding subscribers. In this way, notwithstanding the disparate nature of incoming messages, a uniform outgoing message can be provided to the subscribing presentation layer.

A filter service 220 further can be provided as an adjunct to the event parser 230. The filter service 220 can provide to the administrator of the message adapter 200 a function for user defined criteria for including or excluding incoming messages and events. In this regard, it can be desirable to quash certain messages of limited value so as to conserve valuable processing resources both in the message adapter 200 and in subscribing elements in the presentation layer. For instance, under nominal conditions, resource consumption messages such as "out of resource xxx" messages can become cumulative having limited value for subscribing elements. Accordingly, the filter service 220 can quash the transmission of such messages. Still, under resource limited conditions, the transmission of such messages can be of paramount importance. Thus, under such resource limited circumstances resource consumption message can be permitted to pass.

Importantly, a pattern analyzer 280 can be coupled both to the filter service 220 and the event parser 230. The pattern analyzer 280 can analyze incoming messages and events to detect patterns of occurrence. Based upon the detected patterns, the pattern analyzer 280 can produce a predictive order of incoming messages and events. Using the predicted order, the pattern analyzer 280 can recommend an order for the parsing rules both within and outside of the cache. Based upon the recommendation of the pattern analyzer 280, both the Rule Search Service 240 and the Rule Cache Manager 250 can maintain the most efficient list of parsing rules.

Notably, the recommendation also can be used by self-adjusting filters of the filter service 220 based upon the patterns of incoming event and messages that enable to build a prediction model to automatically and dynamically adjust the filters used to allow and or disallow flow of specific events. For example, in the nominal resource consumption condition, resource consumption messages can be routinely quashed as their respective value to subscribing elements can be limited at based. By comparison, upon detecting a pattern of incoming "out of resource xxx" messages, a recommendation can be issued that subsequent resource consumption messages be allowed to pass.

Finally, a rule factory 270 can be included within the message adapter 200. The rule factory 270 can generate new rules based upon either user defined sets of criteria, or through a set of keywords provided through domain expertise. Such keywords can include, by way of example, variations of "return code", "class name", "terminated", and "out of xxx". In any case, using the rule factory 270, rule for messages and events can be developed which at the time of the distribution of the message adapter 200, were unforeseen and therefore not initially included.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embodied in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. An autonomic event parser comprising:
   a storage device storing parsing rules, said parsing rules having a strategically specified order;
   a pattern analyzer programmed to:
   identify patterns of received messages to produce a predictive order of incoming messages, and
   recommend said strategically specified order of said parsing rules based upon said identified patterns;
   a parsing rules manager communicatively coupled both to said pattern analyzer and said store of parsing rules, said parsing rules manager ordering said parsing rules in said store based upon said recommended order of said pattern analyzer;
   a cache of selected ones of said parsing rules; and
   a cache manager communicatively coupled both to said pattern analyzer and said cache, said cache manager having a configuration for ordering said selected ones of said parsing rules in said cache based upon said recommended order of said pattern analyzer.

2. The autonomic event parser of claim 1, wherein said cache manager further comprises a configuration for expelling selected ones of said parsing rules from said cache.

3. The autonomic event parser of claim 1, further comprising:
   a message filter service coupled to said pattern analyzer and programmed to quash selected ones of received messages based upon at least one message filter configured according to patterns identified in said pattern analyzer.

4. The autonomic event parser of claim 1, further comprising:
   a rule factory coupled to said store of parsing rules and configured to produce new parsing rules based upon a set of user specified terms.

5. In an application computer system, a message adapter comprising:
   a message subscription/publication service configured to accept subscriptions from subscribing programmatic elements in the application system, and to accept publication requests from publishing components in the application system;
   a message receiver configured to receive published messages from individual ones of said publication requests; and,
   an autonomic event parser coupled to said message receiver, said autonomic event parser comprising
   a storage device storing parsing rules, said parsing rules having a strategically specified order,
   a pattern analyzer programmed to
   identify patterns of received messages to produce a predictive order of incoming messages, and
   recommend said strategically specified order of said parsing rules based upon said identified patterns, and,
   a parsing rules manager communicatively coupled both to said pattern analyzer and said store of parsing rules, said parsing rules manager ordering said parsing rules in said store based upon said recommended order of said pattern analyzer, said autonomic event parser having a configuration for selecting and applying individual ones of said parsing rules to said received messages to produce uniformly formatted messages suitable for transmission to said subscribing programmatic elements in the application system, wherein said autonomic event parser further comprises:
   a cache of selected ones of said parsing rules; and,
   a cache manager communicatively coupled both to said pattern analyzer and said cache, said cache manager having a configuration for ordering said selected ones of said parsing rules in said cache based upon said recommended order of said pattern analyzer.

6. The message adapter of claim 5, wherein said cache manager further comprises a configuration for expelling selected ones of said parsing rules from said cache.

7. The message adapter of claim 5, wherein said autonomic event parser further comprises:
   a message filter service coupled to said pattern analyzer and programmed to quash selected ones of received messages based upon at least one message filter configured according to patterns identified in said pattern analyzer.

8. The message adapter of claim 5, wherein said autonomic event parser further comprises:
   a rule factory coupled to said store of parsing rules and configured to produce new parsing rules based upon a set of user specified terms.

9. A computer-implemented message adapting method comprising the steps of:
   receiving disparately formatted messages from publishing ones of application components in an application system;
   selecting and applying individual parsing rules from among a store of parsing rules to each of said received disparately formatted messages to produce uniformly formatted messages suitable for transmission to subscribing elements in the application system;
   analyzing patterns of said received messages to produce a predictive order of incoming messages;
   ordering each of said individual parsing rules in said store of parsing rules according to said analyzed patterns of said received messages;
   caching selected ones of said applied parsing rules; and
   ordering each of said selected ones of said cached parsing rules according to said analyzed patterns of said received messages.

10. The method of claim 9, further comprising the step of expelling selected ones of said applied parsing rules from said cache.

11. The method of claim 9, further comprising the steps of:
    configuring at least one message filter;
    activating at least one configured message filter; and,
    filtering selected ones of said received messages based upon said at least one activated configured message filter.

12. The method of claim 9, wherein said activating step comprises the steps of:

activating said at least one configured message filter based according to said analyzed patterns of said received messages.

13. The method of claim 12, further comprising the steps of:
processing a list of user specified terms;
producing at least one new parsing rule based upon said list of user specified terms; and,
adding said at least one new parsing rule to said store of parsing rules.

14. A machine readable storage having stored thereon a computer program for adapting messages in an application system, the computer program comprising a routine set of instructions which when executed by the machine can cause the machine to perform the steps of:
receiving disparately formatted messages from publishing ones of application components in an application system;
selecting and applying individual parsing rules from among a store of parsing rules to each of said received disparately formatted messages to produce uniformly formatted messages suitable for transmission to subscribing elements in the application system;
analyzing patterns of said received messages to produce a predictive order of incoming messages;
ordering each of said individual parsing rules in said store of parsing rules according to said analyzed patterns of said received messages;
caching selected ones of said applied parsing rules; and
ordering each of said selected ones of said cached parsing rules according to said analyzed patterns of said received messages.

15. The machine readable storage of claim 14, further comprising the step of expelling selected ones of said applied parsing rules from said cache.

16. The machine readable storage of claim 14, further comprising the steps of:
configuring at least one message filter;
activating at least one configured message filter; and,
filtering selected ones of said received messages based upon said at least one activated configured message filter.

17. The machine readable storage of claim 16, wherein said activating step comprises the steps of:
activating said at least one configured message filter based according to said analyzed patterns of said received messages.

18. The machine readable storage of claim 14, further comprising the steps of:
processing a list of user specified terms;
producing at least one new parsing rule based upon said list of user specified terms; and,
adding said at least one new parsing rule to said store of parsing rules.

* * * * *

UNITED STATES PATENT AND TRADEMARK OFFICE
CERTIFICATE OF CORRECTION

PATENT NO. : 7,596,793 B2  
APPLICATION NO. : 10/334254  
DATED : September 29, 2009  
INVENTOR(S) : Grabarnik et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1912 days.

Signed and Sealed this

Twenty-eighth Day of September, 2010

David J. Kappos  
*Director of the United States Patent and Trademark Office*